(12) United States Patent
Hanson et al.

(10) Patent No.: US 9,695,927 B2
(45) Date of Patent: Jul. 4, 2017

(54) MOTOR-GEARBOX ASSEMBLY

(75) Inventors: Matthew S. Hanson, Palatine, IL (US); Lee Wang, Naperville, IL (US); George Thomas, Lombard, IL (US); Sanel Tatar, Schaumburg, IL (US); Edmund Henke, Lake Geneva, WI (US); Tyler Brauhn, Batavia, IL (US); Jim Parejko, Aurora, IL (US)

(73) Assignee: BISON GEAR & ENGINEERING CORP., St. Charles, IL (US)

( * ) Notice: Subject to any disclaimer, the term of this patent is extended or adjusted under 35 U.S.C. 154(b) by 855 days.

(21) Appl. No.: 12/512,692

(22) Filed: Jul. 30, 2009

(65) Prior Publication Data

US 2011/0023640 A1 Feb. 3, 2011

(51) Int. Cl.
| | | |
|---|---|---|
| *F16H 57/02* | (2012.01) | |
| *F16H 57/032* | (2012.01) | |
| *H02K 7/116* | (2006.01) | |
| *H02K 15/16* | (2006.01) | |
| *F16H 57/022* | (2012.01) | |
| *F16H 57/00* | (2012.01) | |

(52) U.S. Cl.
CPC .......... *F16H 57/032* (2013.01); *H02K 7/116* (2013.01); *H02K 15/16* (2013.01); *F16H 2057/005* (2013.01); *F16H 2057/02013* (2013.01); *F16H 2057/0225* (2013.01); *F16H 2057/02034* (2013.01); *F16H 2057/02069* (2013.01); *Y10T 74/19684* (2015.01)

(58) Field of Classification Search
CPC .......... H02K 7/116; F16H 2057/02034; B65G 23/08

USPC .................. 74/421 A, 606 R; 310/83, 89, 99
See application file for complete search history.

(56) References Cited

U.S. PATENT DOCUMENTS

| | | | | |
|---|---|---|---|---|
| 805,499 | A | * 11/1905 | Stoycheff | ........................ 310/78 |
| 1,875,205 | A | 8/1932 | Apple | |
| 3,073,176 | A | * 1/1963 | Daugirdas | ............... F16H 57/04 |
| | | | | 184/6.12 |
| 3,239,699 | A | * 3/1966 | Ferrary | .......................... 310/83 |
| 3,241,397 | A | * 3/1966 | Wilkinson | .................. 74/606 R |
| 4,048,530 | A | 9/1977 | Kaufman, Jr. | |
| 5,334,897 | A | 8/1994 | Ineson et al. | |
| 6,040,647 | A | 3/2000 | Brown et al. | |

(Continued)

FOREIGN PATENT DOCUMENTS

| | | | |
|---|---|---|---|
| DE | 1 022 158 | * | 1/1958 |
| JP | 8-186955 | * | 7/1996 |

OTHER PUBLICATIONS

Bluffton Motor Works, 2007 Bluffton Motor Works, Hydroduty, 24 Pgs.

*Primary Examiner* — William C Joyce
(74) *Attorney, Agent, or Firm* — Garlick & Markison; Timothy W. Markison (57) ABSTRACT

A motor-gearbox assembly includes a housing, a motor, and a gearbox. The housing includes a first alignment mechanism and a second alignment mechanism. The first alignment mechanism is at a first end of the housing and the second alignment mechanism is at a second end of the housing. The motor is mechanically positioned within the housing in accordance with the first alignment mechanism. The gearbox is mechanically positioned within the housing in accordance with the second alignment mechanisms to mechanically couple to the motor.

6 Claims, 8 Drawing Sheets

(56) References Cited

U.S. PATENT DOCUMENTS

| | | | |
|---|---|---|---|
| 6,069,421 A | 5/2000 | Smith et al. | |
| 6,443,295 B1 * | 9/2002 | Hill | 198/788 |
| 6,772,653 B1 * | 8/2004 | Franksson | 74/89.36 |
| 7,147,929 B2 | 12/2006 | Amagi et al. | |
| 7,154,200 B2 | 12/2006 | Neal | |
| 2006/0119197 A1 | 6/2006 | Puterbaugh et al. | |
| 2008/0061649 A1 | 3/2008 | Kim et al. | |

* cited by examiner

MOTOR-GEARBOX ASSEMBLY

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to electro-mechanical conversion and more particularly to motors and/or gearboxes.

Description of Related Art

As is known, there are various types of electric motors and an almost endless variety of uses for them. For instances, an electric motor may be an AC motor (e.g., synchronous or induction), a servo motor, a DC motor, or an electrostatic motor (e.g., magnetic motor) and may be used in applications that range from micro-mechanical systems (MEMS), to food processing equipment, to household appliances, to power tools, to automobiles, to toys, to large manufacturing equipment, etc. Basically any device that uses mechanical motion includes an electric motor.

Due to the vast uses of electric motors, they come in an almost endless variety of sizes, shapes, and power levels. For instance, the size of a MEMS motor is small enough to fit on an integrated circuit and supplies nano-watts of power, while a large manufacturing equipment motor may be tens of feet in diameter supplying hundreds of thousands of kilowatts of power. Note that power of electric motors is sometimes expressed in horsepower, where one horsepower equals 746 watts.

Regardless of the type, size, shape, and power level, an electric motor includes a stator and a rotor. The stator or rotor includes coils that produce a magnetic field, which causes motion of the rotor (e.g., its shaft rotates). Typically, the speed at which the shaft rotates is not the desired speed of the device incorporating the motor. In these instances, the motor is coupled to a separate gearbox.

As is known, a gearbox provides a speed-torque conversion. For example, a gearbox may be used to slow the rotation down and increase the torque. As another example, a gearbox may be used to increase the speed of rotation and reduce the torque. In addition, a gearbox may be used to change the angle of rotation (e.g., a right-angle rotation).

When a motor and a gearbox are used in a food-processing device, they must be able to withstand constant washings with water and/or other cleaning agents. For these applications, the motor is contained in a watertight stainless steel housing and the gearbox is contained in its own watertight stainless steel housing to produce a "washdown" motor and a "washdown" gearbox. In addition, the motor must be able to continue to operate normally if some moisture does penetrate its watertight stainless steel housing.

Utilizing separate stainless steel housings, or shells, for a motor and a gearbox is expensive since most motor shells are manufactured from carbon steel and most gearbox shells are die cast aluminum, iron, or zinc. For example, a typical motor shell is fabricated from a steel plate that is rolled, welded, drawn over a mandrel (e.g., sized), and then painted. The resulting shell has an inside diameter that is slightly smaller than the stator laminations to provide a press fit of the AC stator. This process would be very expensive if used to manufacture a stainless steel housing. Similarly, using a die-casting method to create a stainless steel housing is very expensive. As such, using stainless steel housings requires new tooling, a new design approach, and/or a new manufacturing approach, which are less expensive.

While stainless steel is the preferred housing for a motor and a gearbox in food processing devices, a motor and gearbox may be contained in a common aluminum housing for non-food processing devices. These aluminum housed motor-gearboxes, however, are not designed to meet the "washdown" requirements of food processing devices and would quickly corrode and eventually fail if used in such devices.

Therefore, a need exists for a motor-gearbox assembly that can withstand the rigorous requirements of food processing devices and that can also be economically produced.

DETAILED DESCRIPTION OF THE INVENTION

Figure 1:
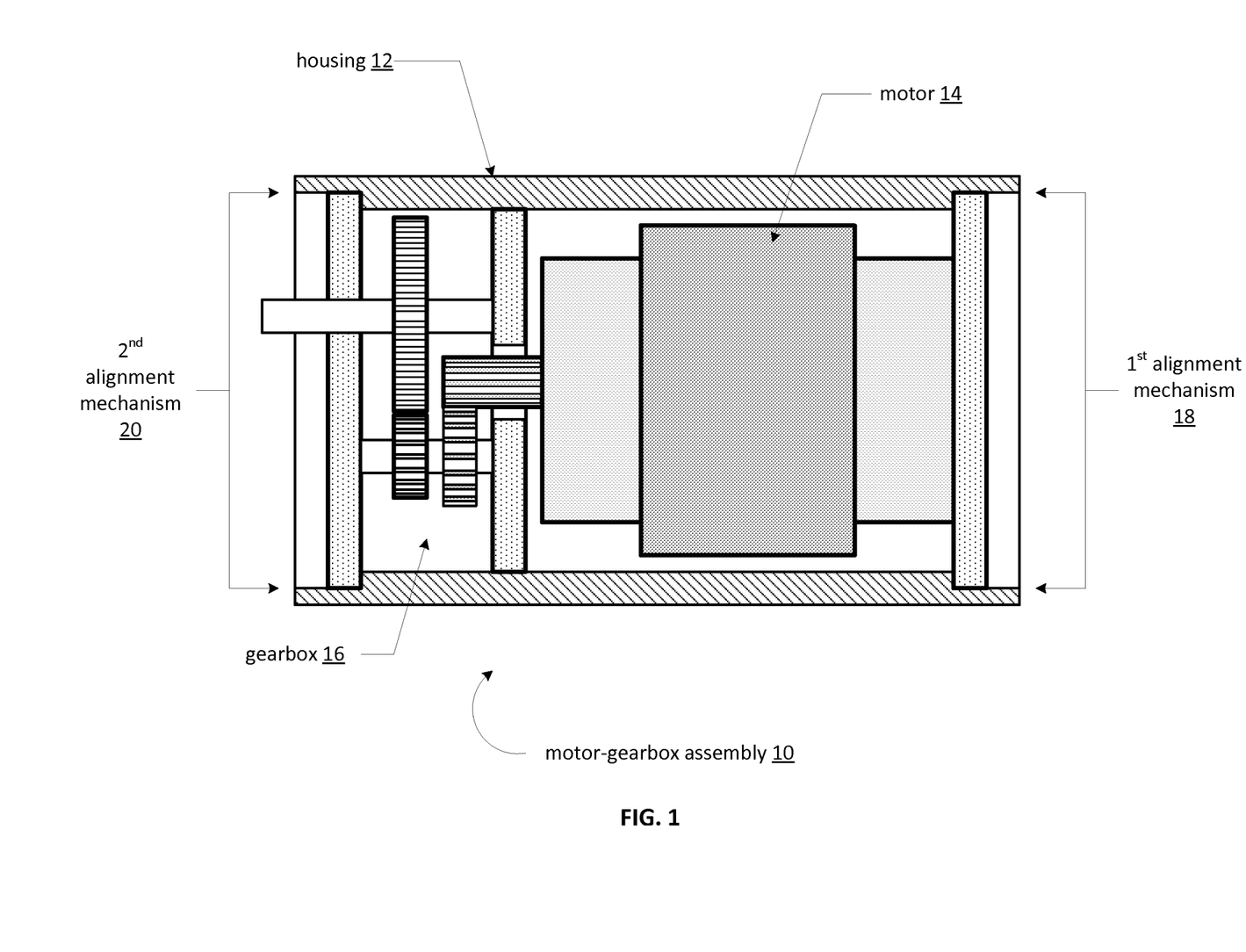
FIG. 1 is a partial cross-sectional diagram of an embodiment of a motor-gearbox assembly in accordance with the present invention.

FIG. 1 is a partial cross-sectional diagram of an embodiment of a motor-gearbox assembly 10 that includes a housing 12, a motor 14, and a gearbox 16. The motor 14 may be any type of motor (e.g., a synchronous AC motor, an induction AC motor, a servo motor, a DC motor, or an electrostatic motor) having a power level and a size corresponding to the requirements of the device incorporating it. For instance, the motor 14 may have a $\frac{1}{20}$ to 1 horsepower requirement and a 2-20 inch outer perimeter by 4-24 inch length size requirement.

The gearbox 16 shall have a design to meet the requirements of the device incorporating it. For example, the gearbox 16 may be designed to have a speed reducing—torque increasing conversion with a specific angle of rotation (e.g., parallel or right angle). As another example, the gearbox 16 may be designed to have a speed increasing—torque reducing conversion with a specific angle of rotation. In addition, to be contained in the same housing 12 as the motor 14, the gearbox has an outer perimeter corresponding to that of the motor 14.

The housing 12, which is shown in a cross-sectional manner, includes a first alignment mechanism 18 and a second alignment mechanism 20. As shown, the first alignment mechanism 18 is at a first end of the housing 12 and the second alignment mechanism 20 is at a second end of the housing 12. The motor 14 is mechanically positioned within the housing 12 in accordance with the first alignment mechanism 18 and the gearbox 16 is mechanically positioned within the housing 12 in accordance with the second alignment mechanism 20 to mechanically couple to the motor 14.

The construct of the first and/or second alignment mechanisms 18 and 20 may be a boring of the housing to creating an inner perimeter of a specific length, depth, and tolerance; may be one or more slots; and/or may be one or more protrusions. The first and second alignment mechanisms 18 and 20 may be of a similar construct or of a different construct. For example, the first alignment mechanism 18 may be a boring of the housing and the second alignment mechanism may be a series of slots corresponding to protrusions on the gearbox. As another example, the first and second alignment mechanisms 18 and 20 may be borings of the same or different lengths, depths, and tolerances.

The housing 12 may be contrasted in a variety of ways. For example, the housing 12 may be a pre-fabricated tube of stainless steel, carbon steel, carbon-fiber, of aluminum that is machined to include the first and second alignment mechanisms 18 and 20. As another example, the housing 12 may have a ruled surface hollowed geometric shape (e.g., a square tube, a cone shaped tube, a rectangular based tube, an elliptical based tube, or any other ruled surface based tube) that is made of stainless steel, carbon steel, carbon-fiber, or aluminum. In yet another example, the housing 12 may be a stainless steel milled structure, a carbon steel milled structure, a carbon-fiber casted structure, or an aluminum formed structure.

Figure 2:
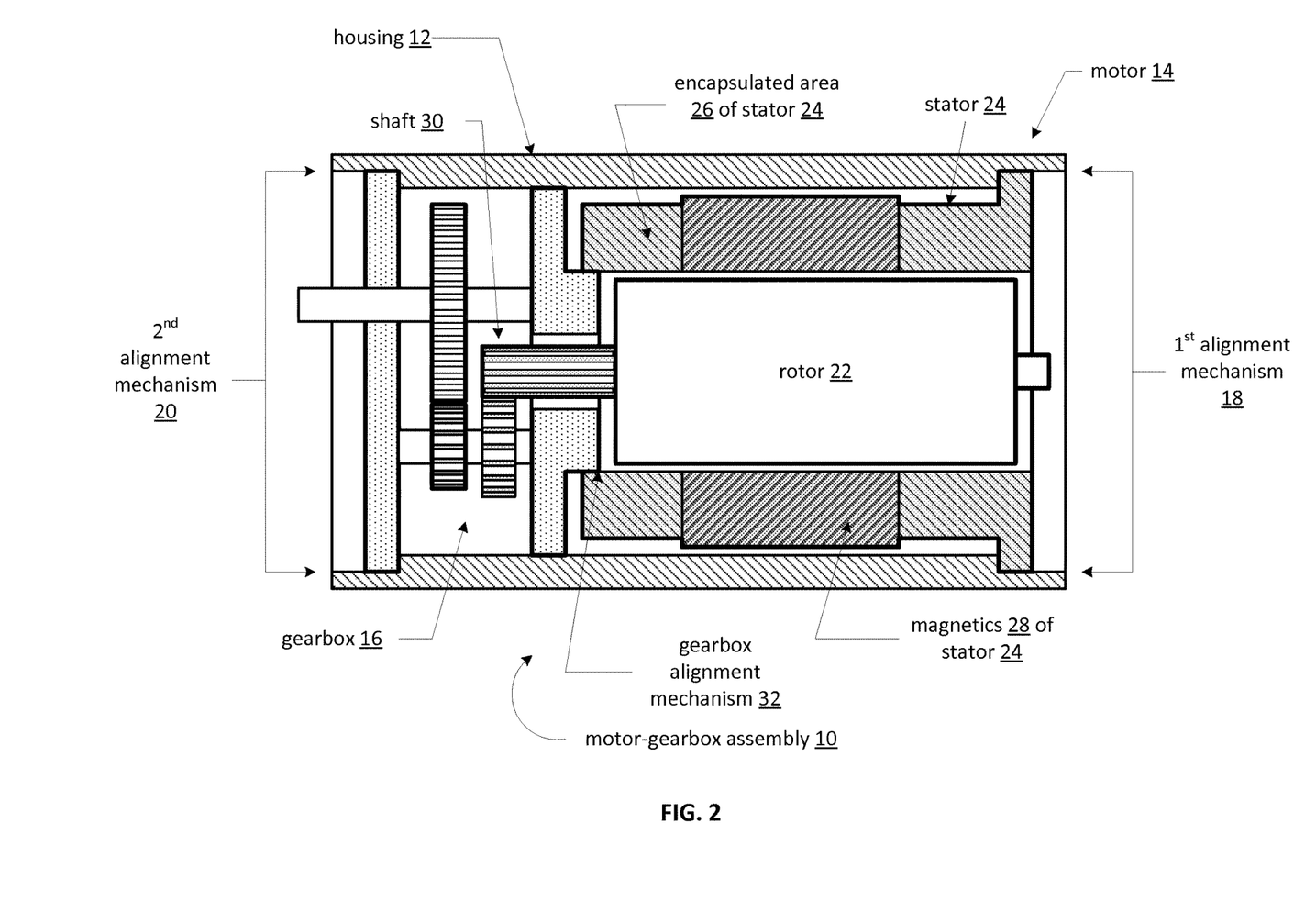
FIG. 2 is a cross-sectional diagram of another embodiment of a motor-gearbox assembly in accordance with the present invention.

FIG. 2 is a cross-sectional diagram of another embodiment of a motor-gearbox assembly 10 that includes the housing 12, the motor 14, and the gearbox 16. In this diagram, the motor 14 is cross-sectioned and includes a rotor 22, an encapsulated area 26 of a stator 24, and magnetics (or laminations) 28 of the stator 24. The motor 14 further includes a gearbox alignment mechanism 32 such that the gearbox 16 is further positioned within the housing 12 and mechanically coupled to the motor 14 in accordance with the gearbox alignment mechanism 32.

In an embodiment, the stator 24, or a portion thereof (e.g., windings), may be encapsulated using a thermal conductive epoxy or polymer (containing heat conductive filter, commonly calcium or aluminum powder), which prevents failure due to corrosion within the motor. Termination of the motor is through an encapsulated cord-set or an IP65 multi-pin connector and cord-set. In this manner, the encapsulant accommodates the wide variation in the inside diameter of a commercially available stainless steel tubing.

To encapsulate the stator, a bore pin may be used to concentrically position a pre-fabricated stator with an end-shield and the first alignment mechanism. The encapsulant is poured or injected into the volume surrounding the motor not taken by the bore pin. In this manner, the bore pin locates the bored area of the housing 12 and further locates a center plate of the motor, which is above the stator. The center plate functions as the gearbox alignment mechanism 32, functions to locate the rotor 22, functions to locate the stator accurately (concentrically), and/or functions to locate a top plate (bearing) of the motor. When the encapsulant is solidified the bore pin is pulled out and the rest of the components are added.

In this manner, the encapsulated portion of the stator 24 has an outer geometry that aids in positioning the motor 14 within the housing 12. As such, the encapsulation is used to protect the electronic elements of the motor (e.g., windings, termination cords, etc.) and is also used to help align the motor within the housing. Note that when power is supplied to motor, the rotor 22 is electro-magnetically coupled to the encapsulated stator 24. Note that, in an embodiment, the shaft may be a parallel shaft 30.

Figure 3:
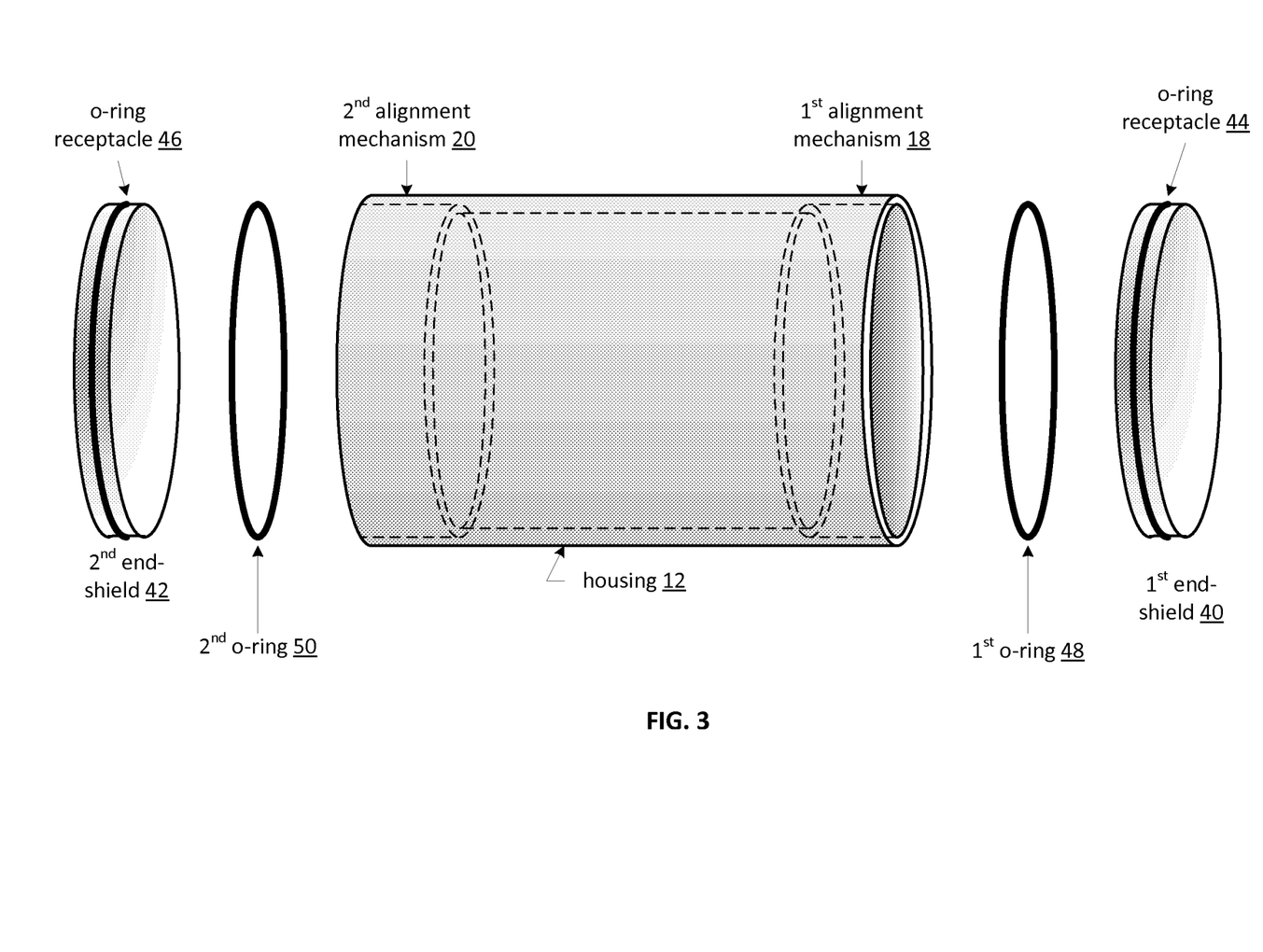
FIG. 3 is a three-dimensional perspective diagram of an embodiment of a housing in accordance with the present invention.

FIG. 3 is a three-dimensional perspective diagram of an embodiment of the housing 12 that further includes a first end-shield 40, a second end-shield 42, a first o-ring 48 and a second o-ring 50. The housing 12 may be constructed of a stainless steel tube having a first inner diameter of a first tolerance. An inner circumference of the first end of the housing 12 is bored to a second inner diameter to produce the first alignment mechanism 18 and the inner circumference of the second end of the housing 12 is bored to a third inner diameter to produce the second alignment mechanism 20. In this embodiment, the second and third inner diameters, which may be the same or different, have a second tolerance that is more strict than the first tolerance.

As an example, the housing 12 may comprise commercially available stainless steel tubing that has an inner diameter tolerance of +/−0.025", which is typically unacceptable for motor applications. In furtherance of this example, the stainless steel tubing may have wall thickness of approximately 0.065". The first and second alignment mechanisms 18 and 20 may be produced by turning the inside diameter at both ends so that the tolerance is reduced to +/−0.003", which is within the sealing capability of o-rings.

To seal the ends of the housing 12, the first end-shield 40 has a first o-ring receptacle 40 and the second end-shield 42 has a second o-ring receptacle 46. While not specifically shown, the first and second alignment mechanisms each includes a corresponding o-ring receptacle such that, when the first-end-shield 40 is mechanically coupled to the first end of the housing 12 and the second end-shield 42 is mechanically coupled to the second end of the housing 12, the first and second o-rings 48 and 50 provide moisture seals for the motor-gearbox assembly. Note that other metal components, including fasteners, of the motor-gearbox assembly 10 are manufactured from 304 series stainless steel or other type of stainless steel.

Figure 4:
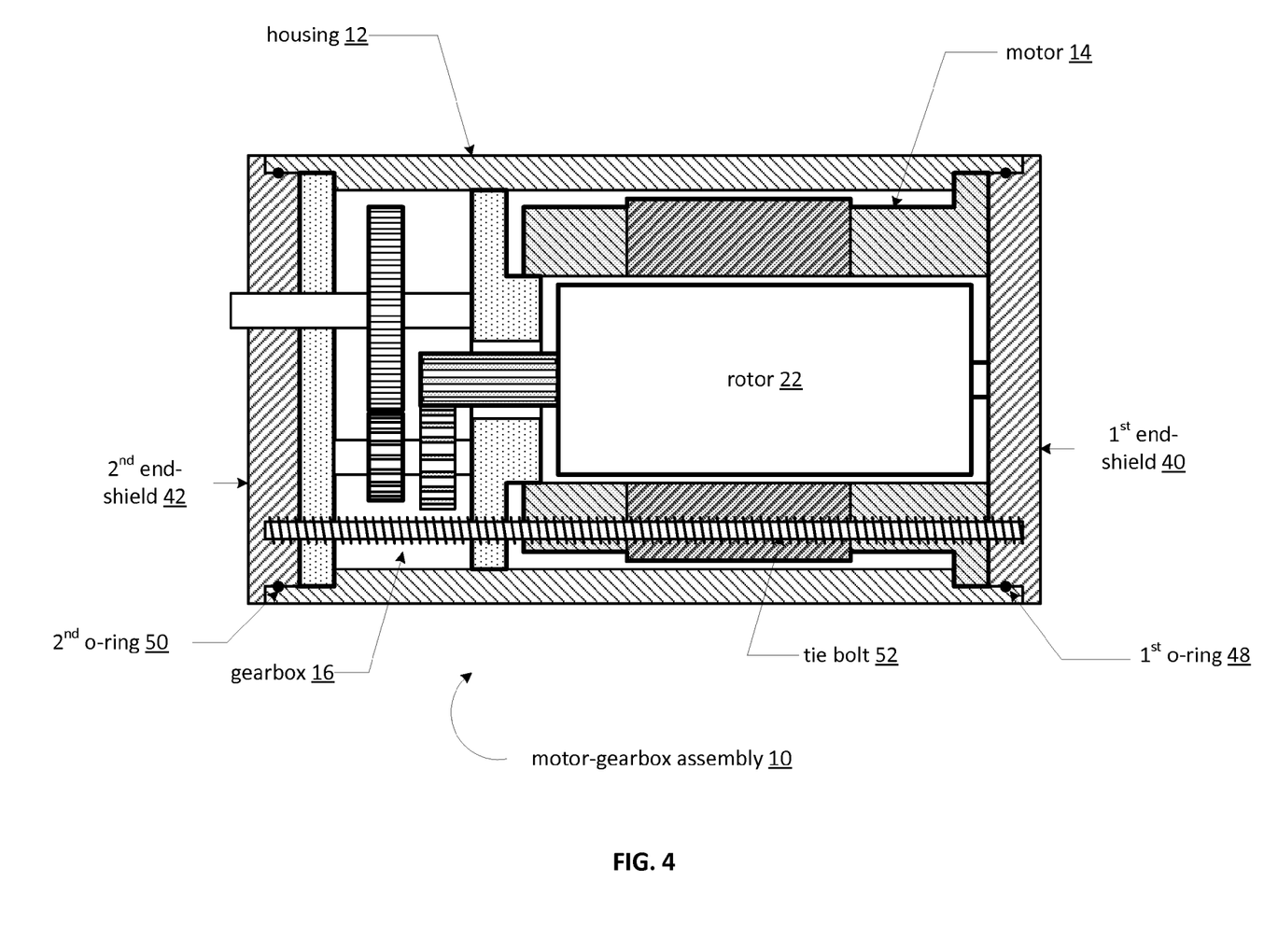
FIG. 4 is a cross-sectional diagram of another embodiment of a motor-gearbox assembly in accordance with the present invention.

FIG. 4 is a cross-sectional diagram of another embodiment of a motor-gearbox assembly 10 that includes the housing 12, the motor 14, the gearbox 16, the first end-shield 40, the second end-shield 42, the first o-ring 48, the second o-ring 50, and at least one tie bolt 52. In this embodiment, the one or more tie bolts 52 is mechanically coupled to the first and/or second end-shields 40 and/or 42 to at least partially mechanically couple the components of the motor-gearbox assembly 10 together.

Figure 5:
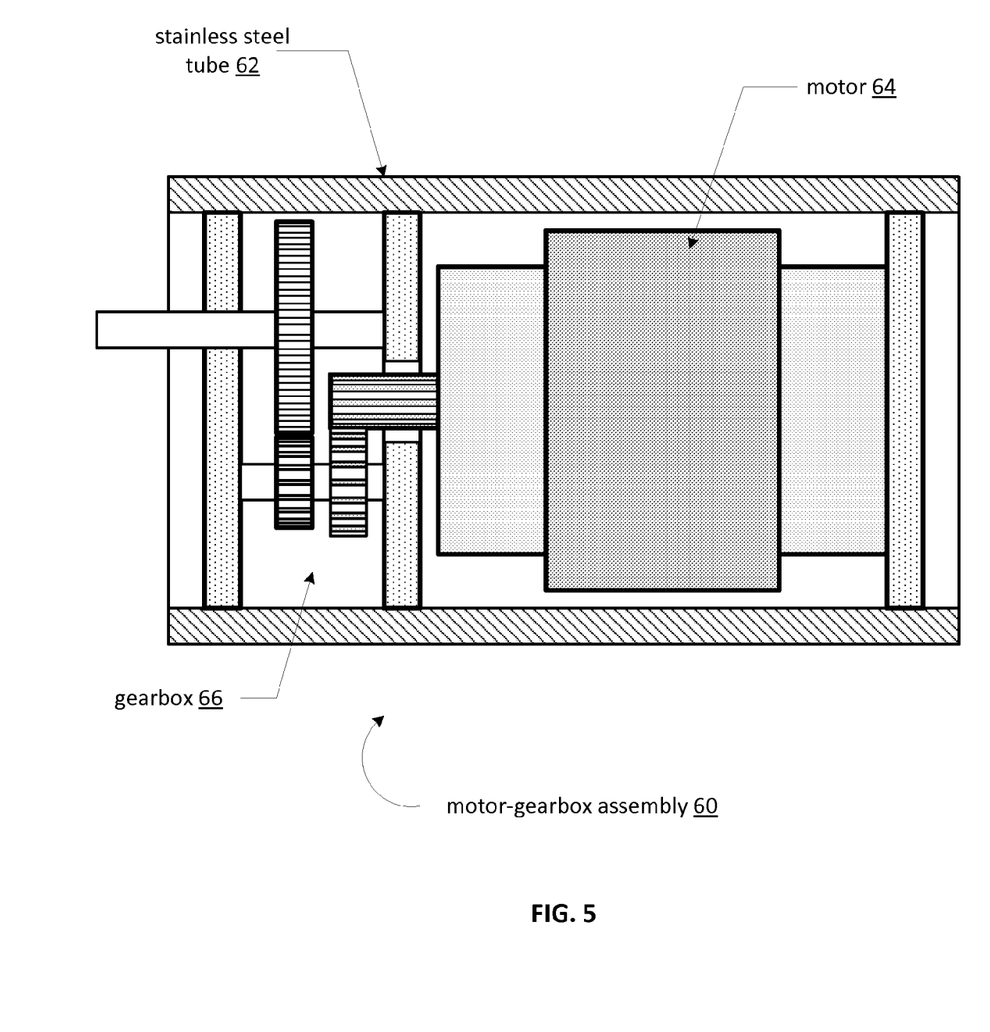
FIG. 5 is a partial cross-sectional diagram of another embodiment of a motor-gearbox assembly in accordance with the present invention.

FIG. 5 is a partial cross-sectional diagram of another embodiment of a motor-gearbox assembly 60 that that may be used as a wash-down motor-gearbox assembly. The assembly 60 includes a stainless steel tube 62, a motor 64, and a gearbox 66. The motor 64 be any type of motor (e.g., a synchronous AC motor, an induction AC motor, a servo motor, a DC motor, or an electrostatic motor) having a power level and a size corresponding to the requirements of the device incorporating it. For instance, the motor 64 may have a 1/20 to 1 horsepower requirement and a 2-20 inch outer perimeter by 4-24 inch length size requirement. In this embodiment, the motor 64 concentrically positioned within the stainless steel tube 62.

The gearbox 66 shall have a design to meet the requirements of the device incorporating it. For example, the gearbox 66 may be designed to have a speed reducing—torque increasing conversion with a specific angle of rotation (e.g., parallel or right angle). As another example, the gearbox 66 may be designed to have a speed increasing—torque reducing conversion with a specific angle of rotation. In addition, to be contained in the same stainless steel tube housing 62 as the motor 64, the gearbox has an outer perimeter corresponding to that of the motor 64. In this manner, the gearbox 66 can be concentrically positioned within the stainless steel tube 62 and mechanically coupled to the motor 64.

In an embodiment, the stainless steel tube 62 may have a first inner diameter of a first tolerance where an inner circumference of a first end of the stainless steel tube is bored to a second inner diameter to produce a first alignment mechanism. Similarly, the inner circumference of a second end of the stainless steel tube is bored to a third inner diameter to produce a second alignment mechanism. The second and third inner diameters, which may be the same value of different values, have a second tolerance that is more strict than the first tolerance. In this manner, the motor 64 may be aligned within the stainless steel tube in accordance with the first alignment mechanism and the gearbox 66 may be aligned with the stainless steel tube in accordance with the second alignment mechanism.

To further aid in positioning of the motor 64 and to provide moisture protection, the motor 64 may include an encapsulated stator and a rotor. The encapsulated stator has an outer geometry that corresponds to a first alignment mechanism of the stainless steel tube. When power is applied to the motor 64, the rotor, which may have a parallel shaft that extrudes into the gearbox 66, is electro-magnetically coupled to the encapsulated stator.

Figure 6:
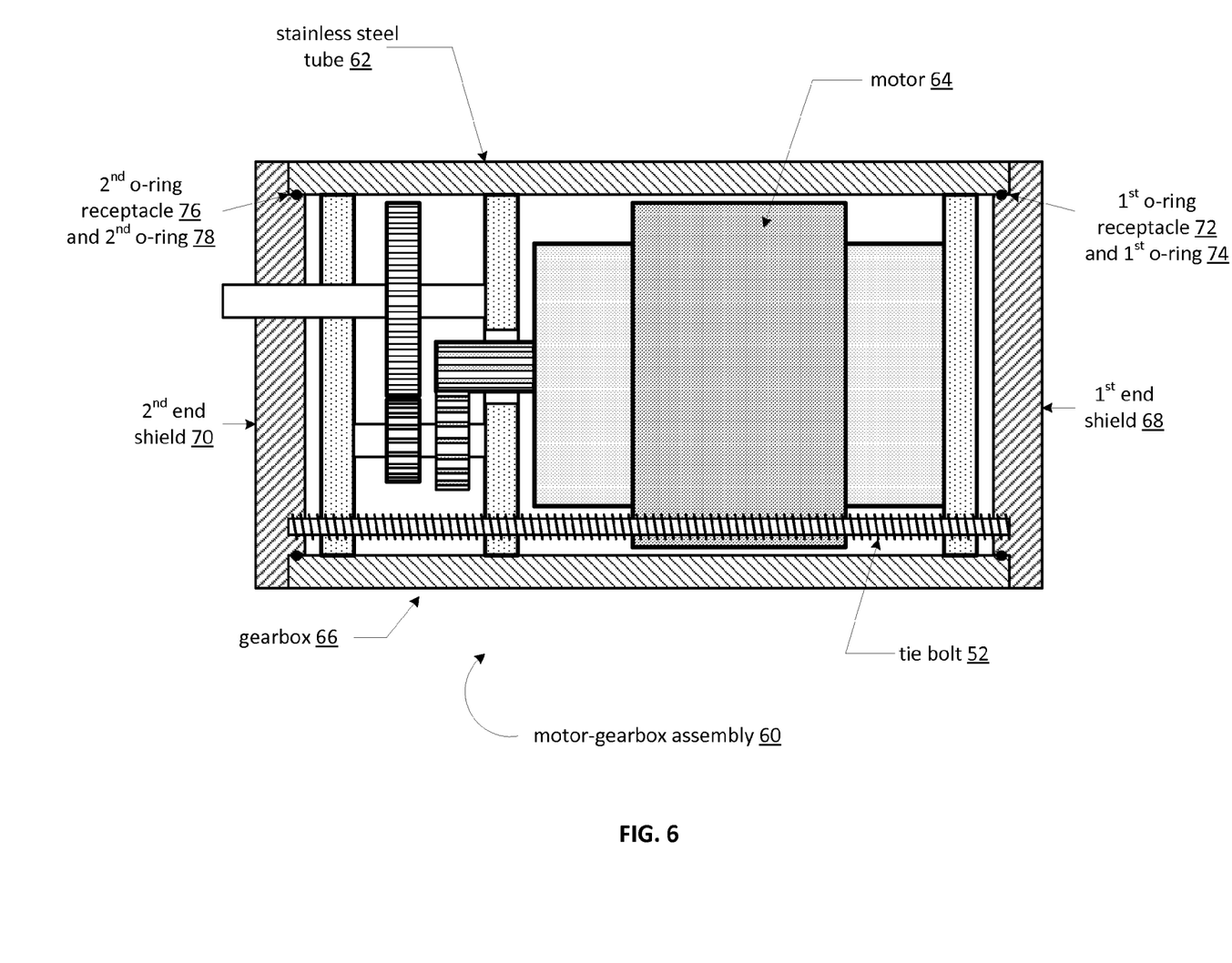
FIG. 6 is a partial cross-sectional diagram of another embodiment of a motor-gearbox assembly in accordance with the present invention.

FIG. 6 is a partial cross-sectional diagram of another embodiment of a washdown motor-gearbox assembly 60 that includes the housing 62, the motor 64, the gearbox 66, a first end-shield 68, a second end-shield 70, a first o-ring 74 and receptacle 72, a second o-ring 76 and receptacle 78, and at least one tie bolt 52. In this embodiment, the one or more tie bolts 52 is mechanically coupled to the first and/or second end-shields 68 and/or 70 to at least partially mechanically couple the components of the washdown motor-gearbox assembly 60 together.

Figure 7:
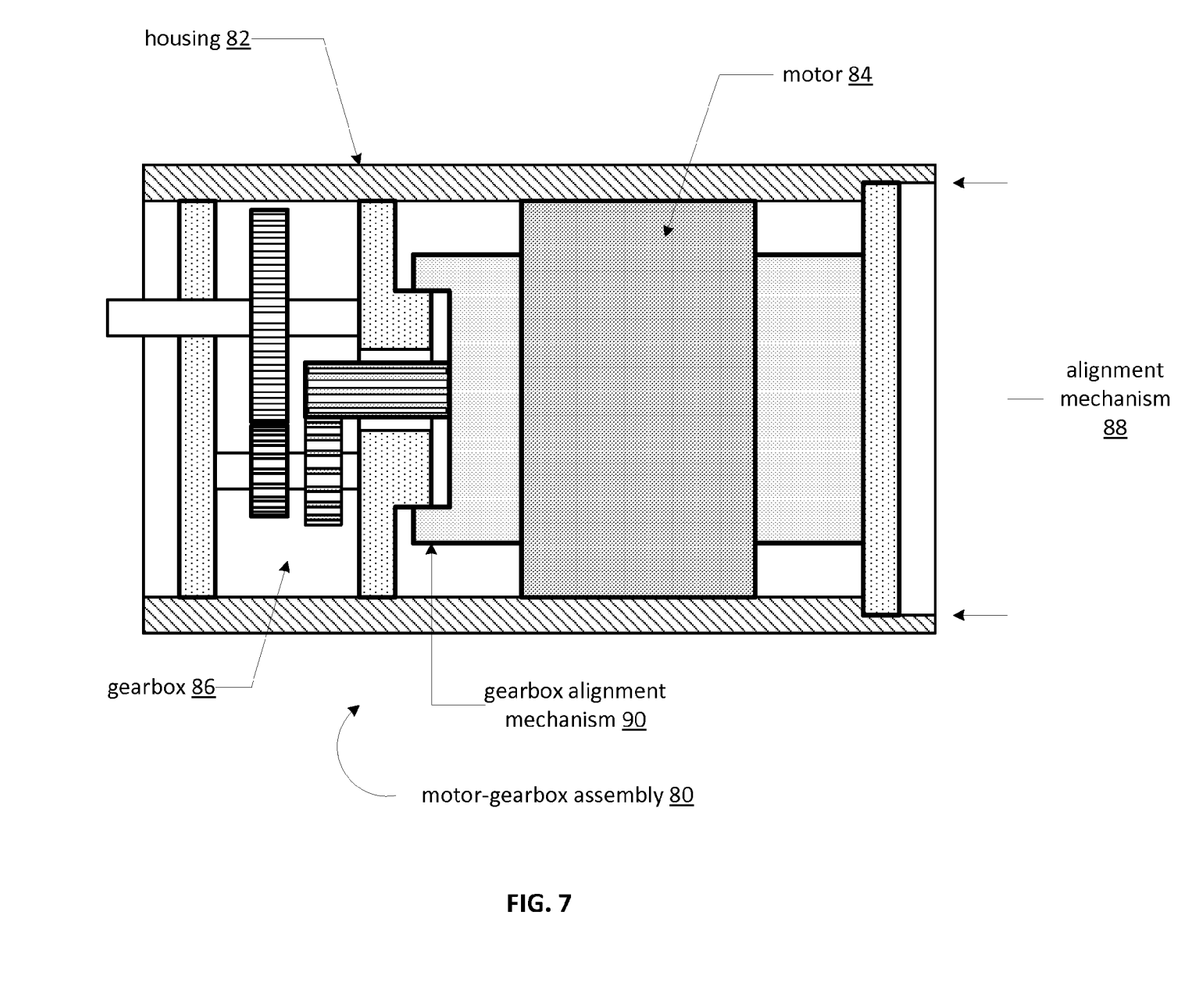
FIG. 7 is a partial cross-sectional diagram of another embodiment of a motor-gearbox assembly in accordance with the present invention.

FIG. 7 is a partial cross-sectional diagram of another embodiment of a motor-gearbox assembly 80 that includes a housing 82, a motor 84, and a gearbox 86. The motor 84 may be any type of motor (e.g., a synchronous AC motor, an induction AC motor, a servo motor, a DC motor, or an electrostatic motor) having a power level and a size corresponding to the requirements of the device incorporating it. For instance, the motor 84 may have a 1/20 to 1 horsepower requirement and a 2-20 inch outer perimeter by 4-24 inch length size requirement.

The gearbox 86 shall have a design to meet the requirements of the device incorporating it. For example, the gearbox 86 may be designed to have a speed reducing—torque increasing conversion with a specific angle of rotation (e.g., parallel or right angle). As another example, the gearbox 86 may be designed to have a speed increasing—torque reducing conversion with a specific angle of rotation. In addition, to be contained in the same housing 82 as the motor 84, the gearbox has an outer perimeter corresponding to that of the motor 84.

The housing 82, which is shown in a cross-sectional manner, includes a first alignment mechanism 88. As shown, the first alignment mechanism 88 is at a first end of the housing 82. The motor 84 is mechanically positioned within the housing 82 in accordance with the first alignment mechanism 88. The motor 84 includes a gearbox alignment 90 such that the gearbox 86 is mechanically positioned within the housing 82 in accordance with the gearbox alignment mechanism 90 to mechanically couple to the motor 14.

The housing 82 may be contrasted in a variety of ways. For example, the housing 82 may be a pre-fabricated tube of stainless steel, carbon steel, carbon-fiber, or aluminum that is machined to include the first and/or second alignment mechanisms. As another example, the housing 82 may have a ruled surface hollowed geometric shape (e.g., a square tube, a cone shaped tube, a rectangular based tube, an elliptical based tube, or any other ruled surface based tube) that is made of stainless steel, carbon-fiber, or aluminum. In yet another example, the housing 82 may be a stainless steel milled structure, a carbon-fiber casted structure, or an aluminum formed structure.

To further aid in positioning of the motor 84 and to provide moisture protection, the motor 84 may include an encapsulated stator and a rotor. The encapsulated stator has an outer geometry that corresponds to a first alignment mechanism of the stainless steel tube. When power is applied to the motor 84, the rotor, which may have a parallel shaft that extrudes into the gearbox 86, is electro-magnetically coupled to the encapsulated stator.

Figure 8:
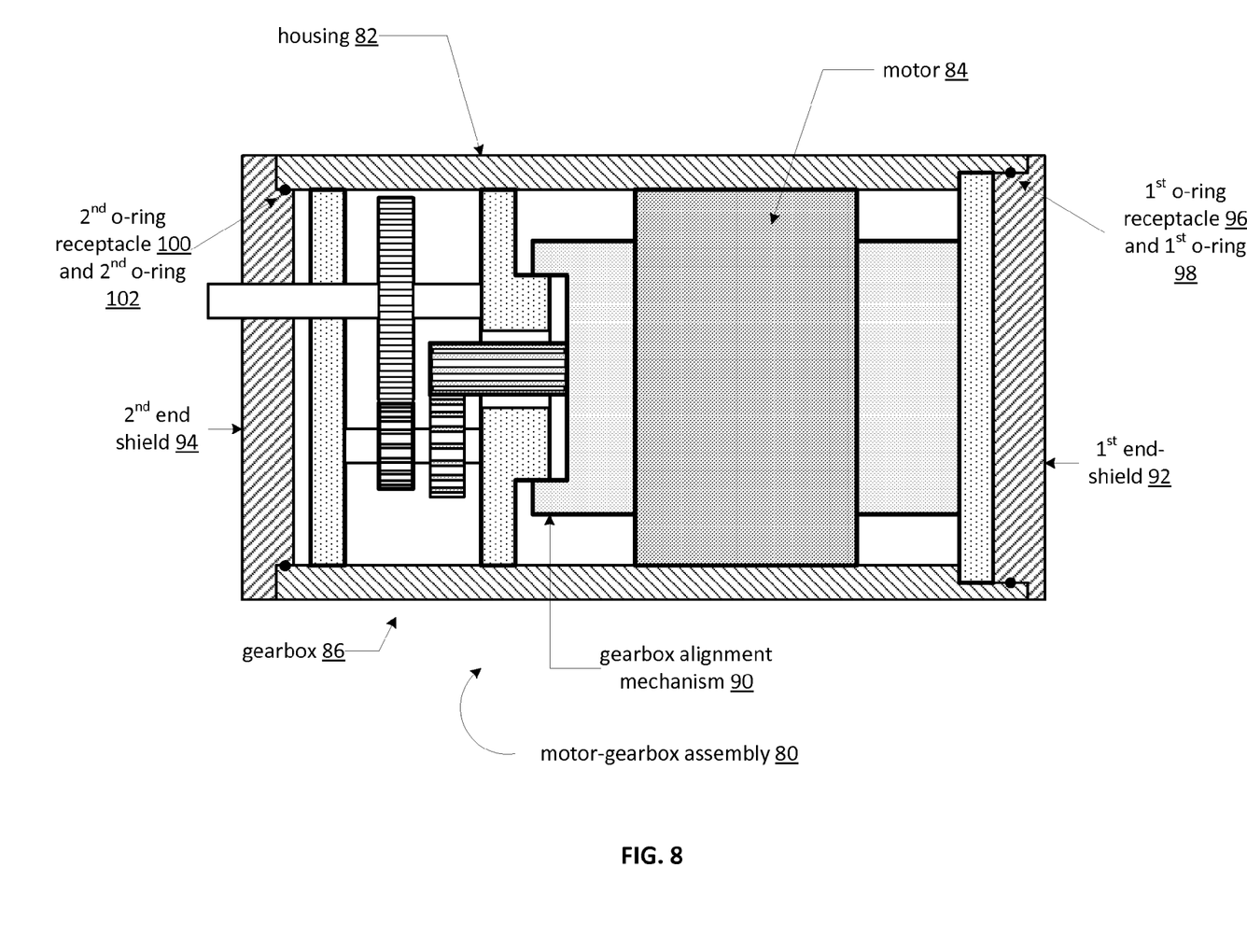
FIG. 8 is a partial cross-sectional diagram of another embodiment of a motor-gearbox assembly in accordance with the present invention.

FIG. 8 is a partial cross-sectional diagram of another embodiment of a motor-gearbox assembly 80 that includes the housing 82, the motor 84, the gearbox 86, a first end-shield 92, a second end-shield 94, a first o-ring 98 and corresponding receptacle 96, a second o-ring 102 and a corresponding receptacle 100. In this embodiment, the first alignment mechanism 92 and the first end-shield 92 include corresponding portions of the first o-ring receptacle 96 to position the first o-ring 98 such that, when mechanically coupled together, they provide a moisture sealed end of the motor-gearbox assembly 80. Similarly, the second end-shield 94 and the housing 82 include corresponding portions of the second o-ring receptacle 100 to position the second o-ring 102 such that, when mechanically coupled together, they provide a second moisture sealed end of the motor-gearbox assembly 80. The mechanical coupling of the end-shields 92 and 94 may be at least partially achieved by using one or more tie bolts.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A motor-gearbox assembly comprises:
   a housing having a cylindrical opening formed there through with one end of the cylindrical opening disposed as a first opening at one end of the housing and an opposite end of the cylindrical opening disposed as a second opening at an opposite end of the housing, in which the cylindrical opening has a first diameter, wherein the housing at the first opening is bored to a first depth, having a second diameter that is greater than the first diameter, to provide a first alignment mechanism and wherein the housing at the second opening is bored to a second depth, having a third diameter that is greater than the first diameter, to provide a second alignment mechanism;
   a first enclosure structure disposed completely inside the first opening of the housing to enclose the first opening;
   a second enclosure structure disposed completely inside the second opening of the housing to enclose the second opening;
   a motor mechanically positioned within the housing in accordance with the first alignment mechanism, wherein at least a portion of the motor is in physical contact with the first enclosure structure;
   a gearbox mechanically positioned within the housing in accordance with the second alignment mechanism and mechanically coupled to a mechanical coupling extending from the motor; and
   a partition disposed within the cylindrical opening separating the motor from the gearbox, except for the mechanical coupling, wherein the first and second enclosure structures secure the motor and gearbox in position and wherein the outer surface of the housing, the outer surface of the first enclosure structure, and the outer surface of the second enclosure structure are void of mounting holes for mounting the enclosure structures to the housing.

2. The motor-gearbox assembly of claim 1, wherein the housing comprises at least one of:
   a stainless steel tube;
   a carbon steel tube;
   a carbon-fiber tube;
   an aluminum tube;
   a stainless steel ruled surface hollowed geometric shape;
   a carbon-fiber ruled surface hollowed geometric shape;
   an aluminum ruled surface hollowed geometric shape;
   a stainless steel milled structure;
   a carbon-fiber casted structure; and
   an aluminum formed structure.

3. The motor-gearbox assembly of claim 1, wherein the housing comprises:
   a stainless steel tube having a first inner diameter of a first tolerance, wherein an inner circumference of the first end of the housing is bored to a second inner diameter to produce the first alignment mechanism and the inner circumference of the second end of the housing is bored to a third inner diameter to produce the second alignment mechanism, wherein the second and third inner diameters have a second tolerance, and wherein the second tolerance is more strict than the first tolerance.

4. The motor-gearbox assembly of claim 3 further comprises:
   the first enclosure structure defining a first end shield having a first o-ring receptacle; and
   the second enclosure structure defining a second end shield having a second o-ring receptacle;
   wherein the first alignment mechanism includes a corresponding first o-ring receptacle and the second alignment mechanism includes a corresponding second o-ring receptacle; wherein the first-end-shield is mechanically coupled to the first end of the housing and the second end-shield is mechanically coupled to the second end of the housing, wherein the mechanical couplings of the first and second end-shields to the first and second ends of the housing are moisture sealed using first and second o-rings within the first o-ring receptacle and the corresponding first o-ring receptacle and within the second o-ring receptacle and the corresponding second o-ring receptacle, respectively.

5. The motor-gearbox assembly of claim 1, wherein the motor comprises:
- an encapsulated stator having an outer geometry, wherein at least a portion of the outer geometry corresponds to the first alignment mechanism; and
- a rotor electro-magnetically coupled to the encapsulated stator.

6. The motor-gearbox assembly of claim 1, wherein the mechanical coupling is a parallel shaft of a rotor extruding into the gearbox.

* * * * *